US011189269B2

(12) United States Patent
Tan et al.

(10) Patent No.: US 11,189,269 B2
(45) Date of Patent: Nov. 30, 2021

(54) ADVERSARIAL TRAINING DATA AUGMENTATION FOR GENERATING RELATED RESPONSES

(71) Applicant: International Business Machines Corporation, Armonk, NY (US)

(72) Inventors: Ming Tan, Malden, MA (US); Ruijian Wang, White Plains, NY (US); Inkit Padhi, White Plains, NY (US); Saloni Potdar, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 16/247,621

(22) Filed: Jan. 15, 2019

(65) Prior Publication Data

US 2020/0227030 A1 Jul. 16, 2020

(51) Int. Cl.
| | |
|---|---|
| *G10L 15/18* | (2013.01) |
| *G10L 15/22* | (2006.01) |
| *G10L 15/06* | (2013.01) |
| *G06F 40/205* | (2020.01) |
| *G06F 16/24* | (2019.01) |
| *G06N 3/08* | (2006.01) |
| *G06F 40/30* | (2020.01) |

(52) U.S. Cl.
CPC .......... *G10L 15/1815* (2013.01); *G06F 16/24* (2019.01); *G06F 40/205* (2020.01); *G06F 40/30* (2020.01); *G06N 3/08* (2013.01); *G10L 15/063* (2013.01); *G10L 15/22* (2013.01); *G10L 2015/223* (2013.01)

(58) Field of Classification Search
CPC ........ G06F 40/205; G06F 40/30; G06F 16/24; G06N 3/08
See application file for complete search history.

(56) References Cited

U.S. PATENT DOCUMENTS

| | | |
|---|---|---|
| 9,292,262 B2 | 3/2016 | Gabel et al. |
| 9,471,559 B2 | 10/2016 | Castelli et al. |
| 9,477,652 B2 | 10/2016 | Huang |
| 2009/0089044 A1* | 4/2009 | Cooper .................. G06F 40/30 704/9 |
| 2013/0103390 A1 | 4/2013 | Fujita et al. |

(Continued)

OTHER PUBLICATIONS

Wan et al., "Improved dynamic memory network for dialogue act classification with adversarial training." 2018 IEEE International Conference on Big Data (Big Data). IEEE, (Year: 2018).*

(Continued)

*Primary Examiner* — Samuel G Neway
(74) *Attorney, Agent, or Firm* — Lieberman & Brandsdorfer, LLC

(57) ABSTRACT

An intelligent computer platform to introduce adversarial training to natural language processing (NLP). An initial training set is modified with synthetic training data to create an adversarial training set. The modification includes use of natural language understanding (NLU) to parse the initial training set into components and identify component categories. As input is presented, a classifier evaluates the input and leverages the adversarial training set to identify the intent of the input. An identified classification model generates accurate and reflective response data based on the received input.

12 Claims, 10 Drawing Sheets

(56) References Cited

U.S. PATENT DOCUMENTS

| | | | |
|---|---|---|---|
| 2014/0380286 A1* | 12/2014 | Gabel | G06N 5/022 717/139 |
| 2017/0011739 A1 | 1/2017 | Huang | |
| 2017/0300533 A1* | 10/2017 | Zhang | G06F 16/24573 |
| 2017/0308790 A1 | 10/2017 | Nogueira dos Santos et al. | |
| 2018/0225673 A1* | 8/2018 | Dubey | G06Q 10/10 |
| 2018/0330011 A1* | 11/2018 | DeLuca | G06F 16/9032 |
| 2019/0087455 A1* | 3/2019 | He | G06F 40/253 |
| 2019/0220755 A1* | 7/2019 | Carbune | G06N 3/084 |
| 2019/0266483 A1* | 8/2019 | Ozertem | G06N 3/08 |
| 2019/0325068 A1* | 10/2019 | Lai | G06N 3/08 |
| 2019/0371299 A1* | 12/2019 | Jiang | G06N 5/00 |
| 2020/0019863 A1 | 1/2020 | Dua et al. | |
| 2020/0151566 A1* | 5/2020 | Mars | G06F 16/3329 |
| 2020/0226212 A1* | 7/2020 | Tan | G06F 40/205 |
| 2020/0227030 A1* | 7/2020 | Tan | G10L 15/1815 |

OTHER PUBLICATIONS

Iyyer, Mohit, et al., "Adversarial Example Generation with Syntactically Controlled Paraphrase Networks", arXiv:1804.06059v1, Apr. 17, 2018.

Hamilton, William L., et al., Inductive Representation Learning on Large Graphs, 31st Conference on Neural Information Processing Systems, (NIPS 2017), Long Beach, CA.

Cox, Evan, et al., In Pursuit of an Efficient Multi-Domain Text Classification Algorithm, 2016.

Anonymous, Leveraging Domain Knowledge to Create Semi-Automated Training Set for Supervised Machine Learning Classification System with Feedback Loop, ip.com, May 12, 2010.

Anonymous, Semi-Supervised Classification Using Object Metadata, ip.com, Jan. 5, 2018.

Anonymous, Machine Learning Algorithms for Smart Meter Diagnostics, ip.com, Jul. 16, 2015.

Goodfellow, Ian J., Explaining and Harnessing Adversarial Examples, ICLR Mar. 2015.

Miyato, Takeru, et al., Adversarial Training Methods For Semi-Supervised Text Classification, ICLR, May 2017.

Ganitkevitch Juri, et al., The Multilingual Paraphrase Database, Proceedings of the Ninth International Conference on Language Resources and Evaluation (LREC-2014), pp. 4276-4283, May 2014.

He, W. et al., Enriching SMT Training Data Via Paraphrasing, Proceedings of 5th International Joint Conference on Natural Language Processing, pp. 803-810, Nov. 2011.

Pang, B. et al., Syntax-based Alignment of Multiple Translations: Extracting Paraphrases and Generating New Sentences, Proceeding of HLT-NAACL, 2003, pp. 102-109, May-Jun. 2003.

Pavlick, E. et al., PPDB 2.0: Better Paraphrase Ranking, Fine-Grained Entailment Relations, Word Embeddings, and Style Classification, Proceedings of the 53rd Annual Meeting of the Association for Computational Linguistics and the 7th International Joint Conference on Natural Language Processing, pp. 425-430, Jul. 26-31, 2015.

List of IBM Patents or Applications Treated as Related, Jan. 2019.
Office Action, U.S. Appl. No. 16/247,620, dated Aug. 18, 2020.
Office Action, U.S. Appl. No. 16/247,620, dated Feb. 4, 2021.

* cited by examiner

ADVERSARIAL TRAINING DATA AUGMENTATION FOR GENERATING RELATED RESPONSES

BACKGROUND

The present embodiments relate to an artificial intelligence platform and a feature extraction technique. More specifically, the embodiments relate to training augmentation data for text classification and intent generation.

In the field of artificially intelligent computer systems, natural language systems (such as the IBM Watson® artificially intelligent computer system or and other natural language question answering systems) process natural language based on knowledge acquired by the system. To process natural language, the system may be trained with data derived from a database or corpus of knowledge relating to the peculiarities of language constructs and human reasoning.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use data minimum, visual recognition, and natural language processing to solve problems and optimize human processes.

At the core of AI and associated reasoning lies the concept of text classification, which is an area of natural language processing (NLP) that focuses on labeling and organizing text. A natural language classifier service applies cognitive computing techniques to return best matching predefined classes for short text inputs, such as a sentence or a phrase. The text inputs are expressed in natural language and placed into categories. The classifier returns a prediction of a class that best captures what is being expressed in the associated text. Based on the predicted class, an application can be leveraged to take an appropriate action, such as provide an answer to a question, suggest a relevant product based on expressed interest, or forward the text input to an appropriate venue. Accordingly, natural language understanding classifiers evaluate natural language expressions, place the expressions into categories, and return a corresponding classification.

The process of understanding natural language requires reasoning from a relational perspective that can be challenging. Structures, including static structures and dynamic structures, dictate a determined output or action for a given determinate input. The determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying and understanding natural language and processing content responses to the identification and understanding as well as changes to the structures are extremely difficult at a practical level.

SUMMARY

The embodiments include a system, computer program product, and method for natural language content processing, including natural language understanding and content distribution processing.

In one aspect, a computer system is provided with a processing unit operatively coupled to memory, and an artificial intelligence (AI) platform to support natural language processing. A tool in the form of a classifier is provided with the AI platform. The classifier uses natural language understanding (NLU) to evaluate and process received input against an adversarial training set. The classifier leverages the adversarial training set to predict a classification label, which is then used to identify a classification model. The classification model identifies both intent and a corpus corresponding to the input. Using the input as characteristic data, the classification model produces response data that reflects the received input.

In another aspect, a computer program product is provided with a computer readable storage medium having computer readable program code embodied therewith, the program code being executable by a processor to support natural language processing (NLP). Program code is provided to evaluate received input against an adversarial training set using natural language understanding (NLU). Program code leverages the adversarial training set to predict a classification label corresponding to the input, which is then utilized by the program code to identify a classification model. The classification model identifies a corresponding intent and corpus. Program code executes the classification model using the input as characteristic data, and response data is produced to reflect the received input.

In yet another aspect, a method is provided with an artificial intelligence (AI) platform for processing natural language. Received input is evaluated using natural language understating (NLU). An adversarial training set is leveraged to process the evaluated input and identify a classification model. Execution of the classification model identifies the corresponding intent of the input and a corpus corresponding to the model. The classification model uses the input as characteristic data to produce response data that reflects the received input.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Changes to the input of a neural network affect output. Adversarial examples are inputs to a neural network that result in an incorrect output from the network. Systems that incorporate deep learning models utilize training data for image and text classification. To make the deep learning models more robust adversarial training is introduced. As shown and described below, a system, method, and computer program product is provided to combine perturbation based data augmentation with adversarial training. The perturbation is directed at application of a non-complex textual transformation to one or more training sentences. Synthetic data is created from training sentences by replacement of select sentence components, such as terms and paraphrases. A select subset of the synthetic data is utilized in the adversarial training of the classification model as a member of the model training data. Accordingly, the adversarial training not only creates synthetic data, but selects a subset of the synthetic data having an adversarial characteristic, and assigns that subset of synthetic data as training data for the classification model.

Figure 1:
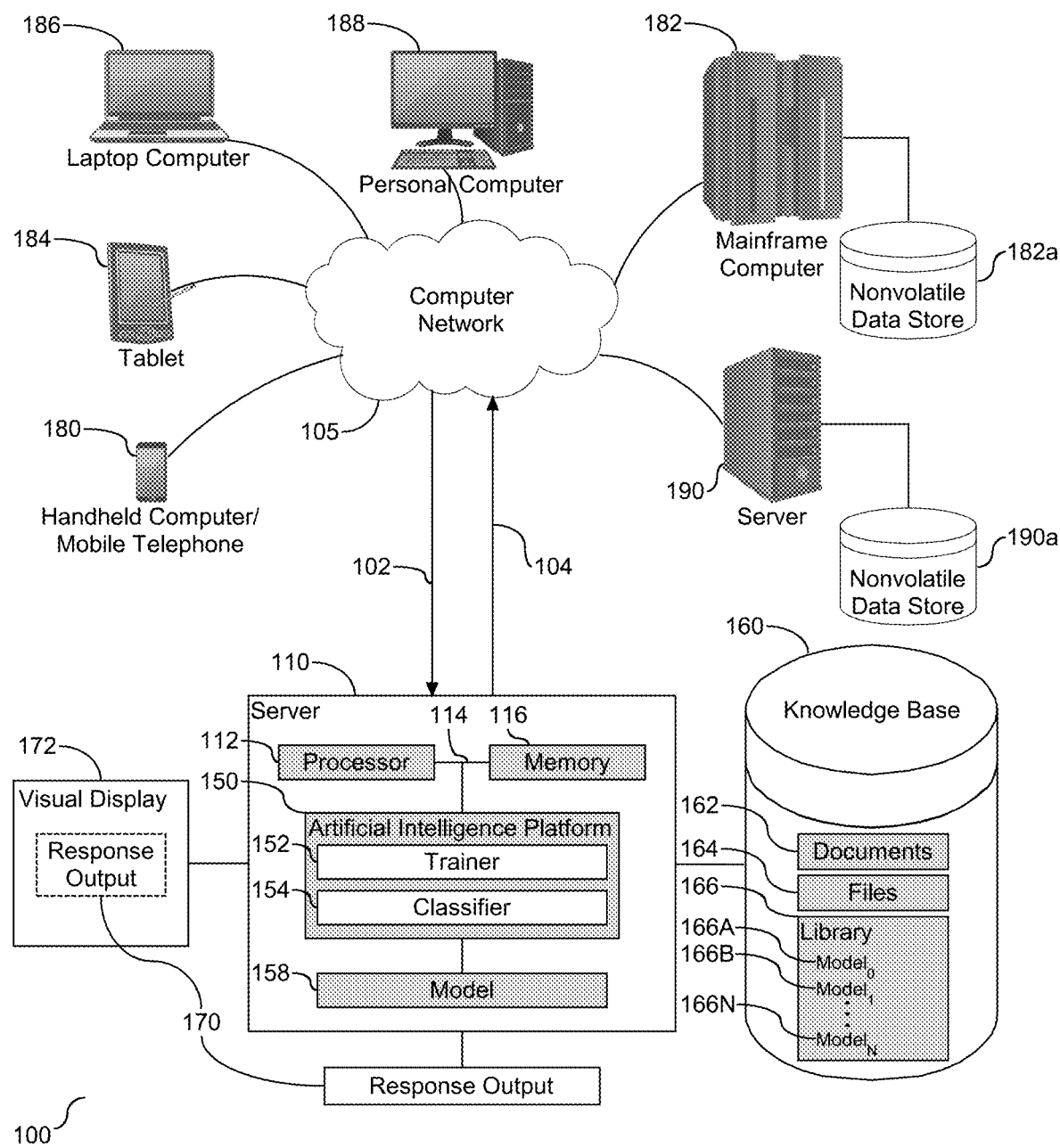
FIG. 1 depicts a system diagram illustrating a schematic diagram of a natural language process system to provide context to word vector and document vector representations.

Referring to FIG. 1, a schematic diagram of a computer system (100) is depicted with a generalized adversarial training framework for text classification. The computer system (100) is configured to train a corresponding intent model classifier and utilize the trained classifier to predict a classification label of received input. As shown, a server (110) is provided in communication with a plurality of computing devices (180), (182), (184), (186), and (188) across a network connection (105). The server (110) is configured with a processing unit (112) in communication with memory (116) across a bus (114). The server (110) is shown with an artificial intelligence (AI) platform (150) for document and context processing over the network (105) from one or more computing devices (180), (182), (184), (186) and (188) via communication paths (102) and (104). More specifically, the computing devices (180), (182), (184), (186), and (188) communicate with each other and with other devices or components via one or more wired and/or wireless data communication links, where each communication link may comprise one or more of wires, routers, switches, transmitters, receivers, or the like. In this networked arrangement, the server (110) and the network connection (105) may enable content and/or context recognition and resolution for one or more content users. Other embodiments of the server (110) may be used with components, systems, sub-systems, and/or devices other than those that are depicted herein.

The AI platform (150) may be configured to receive input from various sources. For example, AI platform (150) may receive input from the network (105), one or more knowledge bases (160) of electronic documents (162) or files (164), or other data, content, and other possible sources of input. In selected embodiments, the knowledge base (160), also referred to herein as a corpus, may include structured, semi-structured, and/or unstructured content in a plurality of documents or files. The various computing devices (180), (182), (184), (186), and (188) in communication with the network (105) may include access points for content creators and content users. Some of the computing devices (180)-(188) may include devices to process the corpus of data with respect to word vector generation, thereby enhancing natural language based services. The network (105) may include local network connections and remote connections in various embodiments, such that the AI platform (150) may operate in environments of any size, including local and global, e.g. the Internet. Additionally, the AI platform (150) serves as a front-end system that can make available a variety of knowledge extracted from or represented in documents, network accessible sources and/or structured data sources. In this manner, some processes populate the AI platform (150), with the AI platform (150) also including input interfaces to receive requests and respond accordingly.

As shown, content may be in the form of one or more electronic documents (162) or files (164) for use as part of the corpus (160) of data with the AI platform (150). The knowledge base (160) may include any structured and unstructured documents or files (162) and (164), including but not limited to any file, text, article, or source of data (e.g. scholarly articles, dictionary, definitions, encyclopedia references, and the like) for use by the AI platform (150). Content users may access the AI platform (150) via a network connection or an internet connection to the network (105), and may submit natural language input to the AI platform (150) that may effectively be processed for intent and corresponding response data. As further described, the intent classification model functions to identify and extract features within an associated document or file corresponding to a received request and associated request data.

The AI platform (150) is shown herein with the tools to support and enable both application and augmentation of an intent classification model. In one embodiment, an initial intent classification model is provided. The tools of the AI platform (150) include, but are not limited to, a trainer (152) and a classifier (154). The trainer (152) functions as a management tool of the intent classification model, hereinafter referred to as the model, including management of model augmentation. The classifier (154) functions as a tool to leverage the model in order to process received data, including application of a classification label, e.g. intent, to the received input, and to return accurate response data (170), which in one embodiment corresponds to the intent. The trainer (152) and the classifier (154) both address intent of a corresponding request, with the trainer (152) maintaining and/or managing the model, and in one embodiment dynamically updating the model responsive to the received request, and the classifier (154) to leverage the model to provide accurate response data. The model (158) is shown herein stored local to the AI platform (150), although this location should not be considered limiting. In one embodiment, the model (158) may be stored on a remote storage device operatively coupled to the server (110). Similarly, although only one classification model (158) is shown herein, it is understood that the system may include a plurality or library of models (158), and as such a singular representation of the model (158) should not be considered limiting. Response data (170) is generated by application of the model (158), and may be communicated to one or more of the systems (180)-(190) across the network connection (105). Similarly, in one embodiment, the generated response data (170) may be presented on a visual display (172) operatively coupled to the server (110).

As briefly described above, the model (158) is leveraged to process a received request with respect to classifying the intent of the request, which in one embodiment directs the classifier (154) to an appropriate library within the knowledge base (160) to process the request. The trainer (152) functions as a tool to manage the model (158), and more specifically manage augmentation of the model (158). As described in detail below, synthetic data is utilized to facilitate augmentation of the model (158). The trainer (152) is either provided with the synthetic data or creates the synthetic data. In one embodiment, the trainer (152) is a natural language processing tool and utilizes natural language understanding (NLU) to parse training data into grammatical components, and leverage a paraphraser or a paraphrase database, to create the synthetic data as related to the training data. The trainer (152) identifies synthetic data as either closely or tangentially related grammatical words or phrases of the training data. The adversarial aspect of the training is directed at selection of a subset of the synthetic data, and the merge of the synthetic data subset into the model (158). In one embodiment, it is the characteristic of the synthetic data subset and selection of this subset that introduces the adversarial characteristics into the training data of the associated model (158). Accordingly, the trainer (152) merges the synthetic data subset with real training data to effectively introduce extra information, e.g. noise, thereby adding robustness to the model (158).

The model (158) is subject to training so that it may adapt to the dynamic nature and characteristics of data and data processing. Although only one model (158) is shown herein, in one embodiment, the knowledge base (160) may include a library (166) of models (166A), (166B), . . . (166N), with different models directed at different subjects and/or categories. The trainer (152) receives initial training data, also referred to herein as a training data set. In one embodiment, the training data set is received from one or more of the devices (180)-(190) across the network connection (102). The training data set may come in different formats. The trainer (152) uses natural language understanding (NLU) to parse the training data into sub-components and identify a category for each parsed sub-components. The parsing supports identification of terms. More specifically, the trainer (152) uses the identified categories to further identify paraphrase terms for the sub-components. Accordingly, the initial aspect of the functionality of the trainer (152) is to process the training set into categories and identify corresponding paraphrase terms.

The trainer (152) creates or builds synthetic phrases, also referred to herein as utterances, with aspects of the training data and the paraphrase terms. More specifically, the trainer selectively replaces the parsed sub-components with the paraphrase terms, with the replacement creating synthetic data, as shown and described in FIGS. 3-7. The synthetic data represents elements of the initial training data set selectively augmented with the paraphrase terms. In one embodiment, the replacement paraphrase terms represent textual disturbances, e.g. perturbations, of initial training data. It is understood that a subset of the synthetic data may be redundant or syntactically incorrect, collectively referred to as irrelevant synthetic data. In one embodiment, low value synthetic data is removed from the synthetic data set. Examples of the low value synthetic data include, but are not limited to, a common word and/or a miss-spelled word. Accordingly, the trainer (152) removes irrelevant and low value synthetic data from the formed set of synthetic data.

Figure 4:
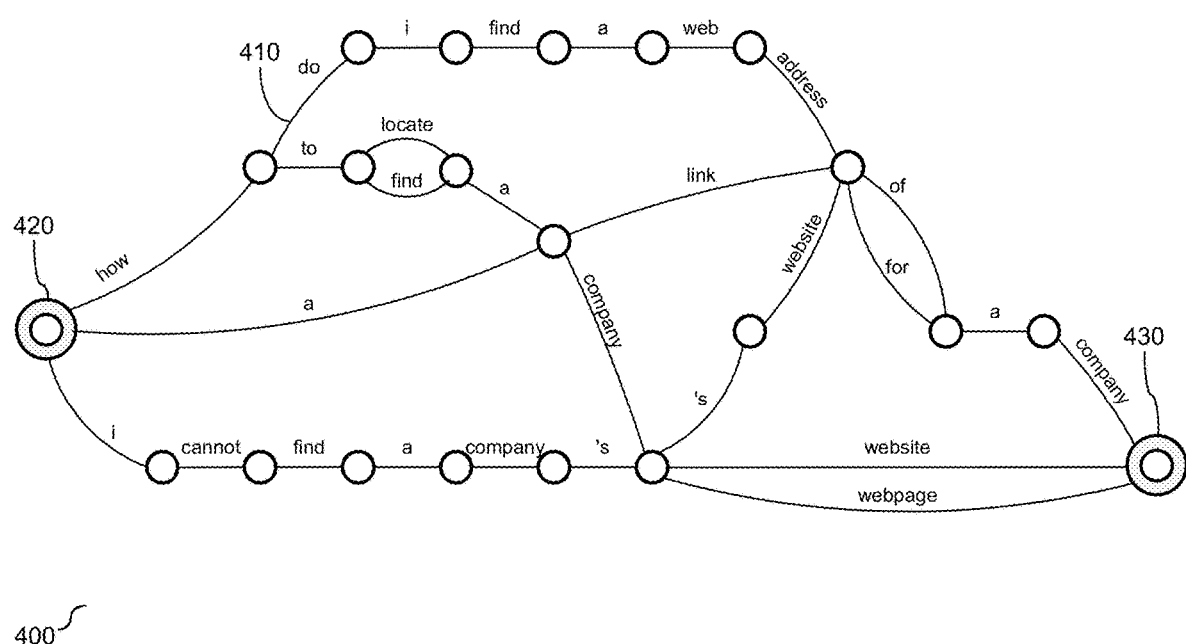
FIG. 4 depicts a diagram illustrating an example lattice graph.

As shown and described, the synthetic data set is a set of data related to the training data and created through term replacement, paraphrasing, etc. The synthetic data set is not to be confused with adversarial training or adversarial data, as described in detail below. As shown in FIG. 4, a lattice graph structure comprised of the initial training data set of the textual perturbations may be utilized to create one or more synthetic phrases or sentences related to the training sentence(s). The lattice graph is constructed by the trainer (152), and includes a plurality of paths that when traversed form synthetic phrases or sentences. The trainer (152) is configured to traverse the paths of the graphs to generate the synthetic sentences. In one embodiment, each path traversed in its entirety forms a synthetic phrase or sentence. It is understood that each synthetic sentence has a similar syntactic structure to the initial training set. Accordingly, each synthetic sentence is represented by a completed path of the lattice graph, and forms a structure grammatical related in form and substance to the initial training set.

The trainer (152) assesses the remaining synthetic data with respect to fluency, and in one embodiment assigns a fluency score to each synthetic data, e.g. each synthetic phrase or synthetic sentence. It is understood that there may be a large quantity of synthetic data, and the fluency score facilitates narrowing the scope of the synthetic data with respect to its relationship to the training data set. In one embodiment, the trainer (152) applies the synthetic data to a language model to identify and filter syntactically incorrect sentences from the set of synthetic data generated from traversal of the lattice graph. Once the filtering or removal of the grammatically improper or low value synthetic data is removed, a set of synthetic data related to the initial training data is formed. An assessment of the formed set of synthetic data is conducted by the trainer (152) to identify the subset of synthetic data that will be employed with the adversarial training. As shown and described in FIG. 5, the trainer (152) calculates a log likelihood score for the synthetic data remaining in the synthetic data set after the low value synthetic data has been removed. The log likelihood score is a mathematical value directed at a relationship of the intent of the synthetic data with respect to the intent of the training set, and more specifically, represents the relative value of the intent of the synthetic data matching the training data. The trainer (152) selects an entry in the synthetic data set with the minimum log likelihood value and merges the corresponding utterance with the training set. This selection maximizes the likelihood of the worst synthetic data set, e.g. synthetic utterance. Accordingly, the adversarial training of the model is directed at combining the worst synthetic utterance with the real training data.

As shown and described herein, the trainer (152) functions as a tool to build and maintain the model (158). It is understood that the model (158) is dynamic in that it is subject to change. The classifier (154) functions as a tool in the AI platform (150) to leverage the model (158) with respect to processing. The classifier (154) applies received input to the model (158) to predict a classification label corresponding to the received input. The classification label corresponds to a classification of the intent of the request, which in one embodiment directs the classifier (154) to an appropriate library or file within the knowledge base (160) to process the request. In one embodiment, the classifier (154) applies the intent to the identified library or file within the knowledge base (160), and generates the response data (170). Accordingly, the classifier (154) leverages the evolved model that has been subject to adversarial training, with the evolved model to identify the intent of the input, which includes classification of a semantic meaning of the input.

As shown and described, the trainer (152) manages evolution and training of the model (158). The classifier (154) leverages the model (158) to create response output (170), which includes classifying the intent of received input, and uses the intent classification to identify an appropriate file or library within the knowledge base (160) for receiving and processing the input. Accordingly, the trainer (152) dynamically maintains the model (158), and the classifier (154) uses the dynamically maintained model (158) to processes the received input and generate corresponding output.

The trainer (152) and classifier (154) function to dynamically maintain and leverage one or more classification models (158) to facilitate generating or identifying semantically related response data, e.g. response data semantically related to the intent of received input. As shown and described, the model (158) may be a library (166) containing a plurality of models (166A)-(166N), in which case the classifier (154) conducts a preliminary assessment of the input to identify an appropriate model (158) for processing the input. Regardless of the manner in which the model (158) is identified or selected, the model evaluates the input, e.g. received communication, and assigns a classification to the intent of the input, with the assigned classification corresponding to the evaluated communication. The classification assignment aligns similarly related textual data. More specifically, the classification assigns the evaluated communication to a mathematically and proximally related library or file in the knowledge base (160). Accordingly, the classifier (154) and the identified model (158) identify a relationship between the evaluated communication and one or more libraries or files in the knowledge base (160).

As shown and described, the original intent model (158) is augmented with synthetic data and subject to adversarial training. It is understood that there is an abundant quantity of the generated synthetic data, and processing all of the synthetic data is a burden. One or more thresholds may be applied to narrow the set of synthetic data. For example, in one embodiment, a first threshold is applied with respect to sampling synthetic data, and a second threshold is applied to a second subset within the sampling of the applied first threshold. In one embodiment, the second subset is a nearness qualifier, such that it identifies synthetic data within the sampling that is mathematically close or proximal to the received input. The log likelihood value is applied to mathematically assess the proximity of the synthetic data to the received input. The selection of the synthetic data within the minimum log likelihood value is directed at optimizing the worst synthetic data within the sample so as to improve the relationship of synthetic data within the sample that is closer to the received and evaluated input. Accordingly, the weakest synthetic data in the sample is optimized to bring new data into the model training data.

The AI platform (150), also referred to herein as an information handling system, employs several tools, e.g. sub-engines, to support the described data processing. These tools include the trainer (152) and the classifier (154). Types of information handling systems that can utilize system (110) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet, computer (184), laptop, or notebook, computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190a), and mainframe computer (182) utilizes nonvolatile data store (182a). The nonvolatile data store (182a) can be a component that is external to the various information handling systems or can be internal to one of the information handling systems.

The AI platform (150) is local to the server (110). In some illustrative embodiments, the server (110) may the IBM Watson® system available from International Business Machines Corporation of Armonk, N.Y., which is augmented with the mechanisms of the illustrative embodiments described hereafter. Although only two tools, e.g. the trainer (152) and the classifier (154), are shown and described herein, the quantity should not be considered limiting. Though shown as embodied in or integrated with the server (110), the AI platform (150) and the associated tools may be implemented in a separate computing system (e.g., 190) that is connected across network (105) to the server (110). Wherever embodied, the trainer (152) and classifier (154) function to dynamically maintain one or more intent classification models (158), assess contextual analysis of received input with respect to classification model(s) (158), and apply the input to a library of documents (162) or files (164) in the knowledge base (160) that corresponds to the identified intent.

Figure 2:
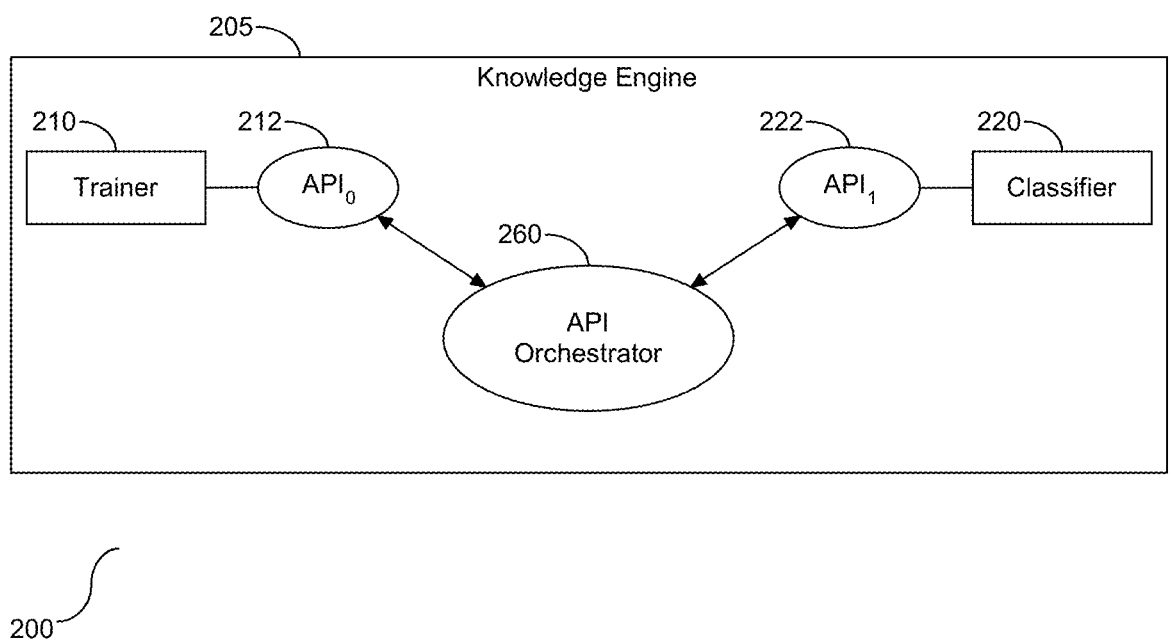
FIG. 2 depicts a block diagram illustrating the tools shown in FIG. 1 and their associated application program interfaces (APIs).

An Application Program Interface (API) is understood in the art as a software intermediary between two or more applications. With respect to the NL processing system shown and described in FIG. 1, one or more APIs may be utilized to support one or more of the tools (152)-(154) and their associated functionality. Referring to FIG. 2, a block diagram (200) is provided illustrating the NL processing tools and their associated APIs. As shown, the tools are embedded within the knowledge engine (205), with the tools including the trainer (210) associated with $API_0$ (212) and the classifier (220) associated with $API_1$ (222). Each of the APIs may be implemented in one or more languages and interface specifications. $API_0$ (212) provides dynamic maintenance of the intent model(s), including generating and assessing synthetic data, and selecting a subset of the synthetic data for application to the adversarial training. $API_1$ (222) provides input processing with respect to an appropriately identified model and corresponding library, document, or file identification. As shown, each of the APIs (212) and (222) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
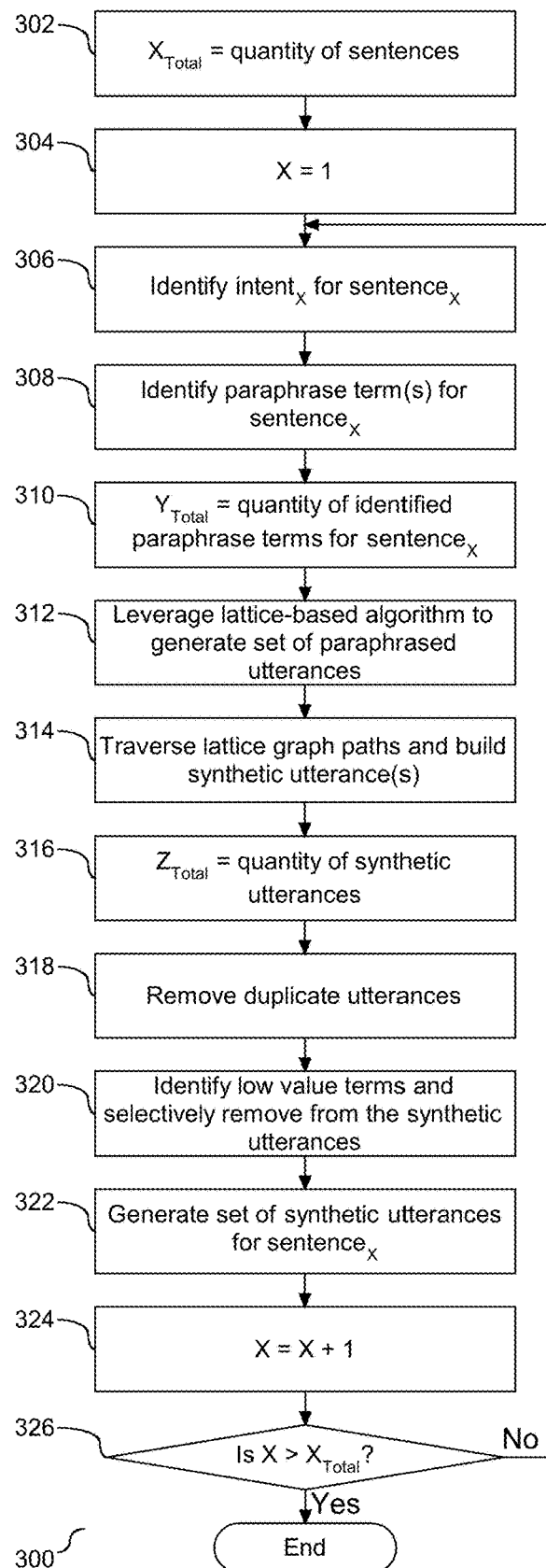
FIG. 3 depicts a flow chart illustrating a process for generating synthetic utterances to expand training data.

Referring to FIG. 3, a flow chart (300) is provided to illustrate a process for generating synthetic utterances to expand training data. The synthetic utterances represent additional training data to be applied to a classifier. In the case of text based data, the classifier is a text classifier, and in the case of image based data, the classifier is an image classifier. Although the following description is directed at textual data and associated classification models, the scope of the embodiments should not be limited to textual data, and in one embodiment may be applied to image or graphic data. As shown and described herein, the classifier functions as a model to classify the intent of receive data. The classifier is dynamic and is subject to modification as it is exposed to training or exposure to data.

As shown, a set of sentences are provided to train the classifier. The set of sentences are identified and the variable $X_{Total}$ is assigned to represent the quantity of sentences in the set (302), and an associated sentence counting variable is initialized (304). For each training sentence, $sentence_X$, the intent, $intent_X$, of the sentence is identified (306) and one or more paraphrase terms for the intent are identified (308). As described below, the training sentences are replaced with one or more paraphrase terms to create synthetic data. The paraphrase terms may be substitution, e.g. perturbation, of one or more words in the training sentence. The quantity of paraphrase terms for $sentence_X$ assigned to the variable $Y_{Total}$ (310). In one embodiment, a paraphrase database is leveraged to pair source terms in the training sentence(s) with target term(s). Each paraphrase is a pair of source and target terms with an associated score. There are three types of paraphrases in the database, including: lexicon-level, phrase-level, and syntactic. The lexicon level is a paraphrase relationship of two words. The phrase-level is a paraphrase relationship of two phrases, e.g. multiple words. The syntactic is a paraphrase relationship of two phrases with some parts as part-of-speech (POS) tags, where any belonging words can be fit into the paraphrases. The score is a count-based score for each source-target pair. Accordingly, for each training $sentence_X$, the adversarial perturbation is a paraphrase replacement of the original training sentences on up to three levels, including lexical, phrasal, and syntactic.

Given training $sentence_X$ and identified paraphrase terms $Y^{Total}$, a lattice-based algorithm is leveraged to generate a new set of paraphrasing, e.g. synthetic, utterances (312). The algorithm builds a lattice graph with paths, and each path being a complete synthetic utterance or sentence. The lattice graph has an expanded search space. Referring to FIG. 4, a diagram (400) is provided to illustrate an example lattice graph. In this example, the training sentence is shown at (410) as "How do I find a web address for a company". Each path shares the same starting point (420) and ending point (430), and each path forms a complete sentence or utterance. In one embodiment, each synthetic sentence includes synonymous terms to the training $sentence_X$. The lattice graph represents an increased search space for candidates. In one embodiment, for each training sentence, more than 500 synthetic sentences or utterances, hereinafter referred to as utterances, are generated. As the lattice graph in this example is traversed, seven example synthetic utterances are provided. The generated synthetic utterances have a close semantic relationship and similar syntactic structures with at least the training sentence (410). Each of the paths in the lattice is traversed to build a plurality of synthetic utterances (314). The variable $Z_{Total}$ is assigned to the quantity of synthetic utterances formed from traversing the paths of the lattice (316). It is understood that in one embodiment duplication synthetic utterances may have been developed. All duplicate utterances in the set of generated utterances are removed (318). In the example lattice shown in FIG. 4, the variable $Z_{Total}$ is assigned to the integer seven. Accordingly, synthetic utterances are formed and subject to an accounting.

It is understood that the synthetic utterances may include low value terms that are not necessary for the classifier training. Following the accounting at step (318), low value terms are identified and selectively removed from the synthetic utterances (320). Examples of low value terms include, but are not limited to, common words, stop words and typographical errors. After the low value terms are removed at step (320), a set of synthetic utterances is generated for training $sentence_X$ (322). Thereafter, the training sentence counting variable is incremented (324), and it is determined if each of the training sentences has been processed to generate the set of synthetic utterances related to the intent, $intent_X$, for training $sentence_X$ (326). A negative response to the determination is followed by a return to step (306), and a positive response concludes the process. Accordingly, and as shown, for each training sentence a lattice graph is generated and a set of synthetic utterances corresponding to the intent of the training sentence is formed.

Figure 5:
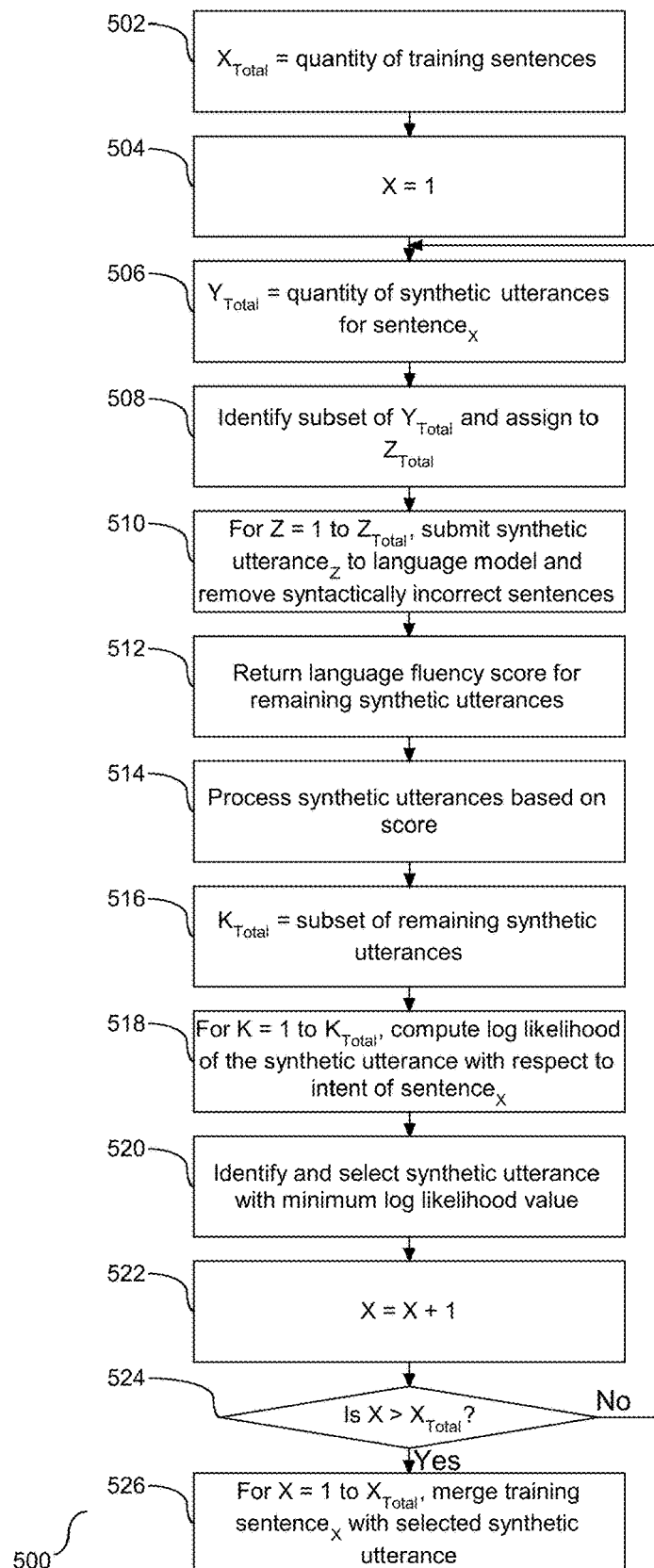
FIG. 5 depicts a flow chart illustrating an adversarial training process to leverage the synthetic utterances formed in FIG. 4.

Referring to FIG. 5, a flow chart (500) is provided to illustrate an adversarial training process to leverage the set of synthetic utterances formed in FIG. 4. As shown, the variable $X_{Total}$ is assigned to represent the quantity of training sentences (502), and a training sentence counting variable is initialized (504). For training $sentence_X$, the set of synthetic utterances are identified and the quantity of synthetic utterances is assigned to the variable $Y_{Total}$ (506). In one embodiment, a subset of the synthetic utterances from the quantity identified at step (506) is utilized for the training. The subset is identified and selected, and assigned to the variable $Z_{Total}$ (508). Each of the selected synthetic utterances, Z, is submitted to a language model to filter out and remove syntactically incorrect sentences (510). The remaining synthetic utterances are submitted to a language model which returns language fluency score (512). Accordingly, each synthetic $sentence_Z$ or synthetic $utterance_Z$ is processed with respect to their fluency score.

The scores assessed at step (512) are employed to identify and select data to be employed in the adversarial training of the model. Synthetic sentences or utterances that fall below a scoring threshold are removed from the set (514). In one embodiment, a similarity metric, such as a language model or a cosine-similarity score, is applied to identify the K nearest synthetic utterances with respect to the intent of training sentence$_r$. In one embodiment, the threshold is a configurable value. Similarly, in one embodiment, the threshold is configured with respect to quantity. Accordingly, regardless of the threshold characteristics, a subset of the synthetic utterances remains and is assigned to the variable $K_{Total}$ (516).

Each of the remaining synthetic utterances is subject to a log likelihood computation with respect to the intent of the training sentence, sentence$_X$, (518). Using the log likelihood computation, the synthetic utterance, utterance$_K$, with the minimum log likelihood value is selected and identified (520). This identification reflects optimizing the weakest synthetic data with respect to the intent of the associated training sentence. Accordingly, each synthetic utterance is assessed with respect to the intent of the training sentence, and the synthetic utterance having the minimum log likelihood value is identified and selected for use in the adversarial training of the model.

As shown, each training sentence is subject to intent evaluation and synthetic utterance identification based on a select computational value. Following step (520), the training sentence counting variable is incremented (522), and it is determined if each of the training sentences has been assessed to identify synthetic data for the adversarial training (524). A negative response to the determination at step (524) is followed by a return to step (506), and a positive response to the determination at step (524) concludes the synthetic utterance evaluation and identification for adversarial training. More specifically, following the positive response at step (524), each training sentence(s) is merged with the identified and selected synthetic utterance (526) determined to have the minimum log likelihood value. Accordingly, each training sentence is merged with the selected synthetic utterance for application to a corresponding classification model to support and enable adversarial training.

The process shown and described in FIG. 5 is directed at identification of synthetic data with a minimum log likelihood value, log P (y|x), wherein x is the input, and y is the output, with respect to proximity to the respective training sentence. It is understood that the classification model is subject to change based on use and application of iterations. In one embodiment, a counter is utilized to track and limit a number of iterations for model training. For each incremental use, the model returned at step (526) is utilized at step (512) for continued training and evolution of the model. Accordingly, the synthetic utterances are selectively identified and applied to the evolving intent classification model until such time as the counter limit is reached or when the model is determined to be stable, e.g. changes are insignificant.

Figure 6:
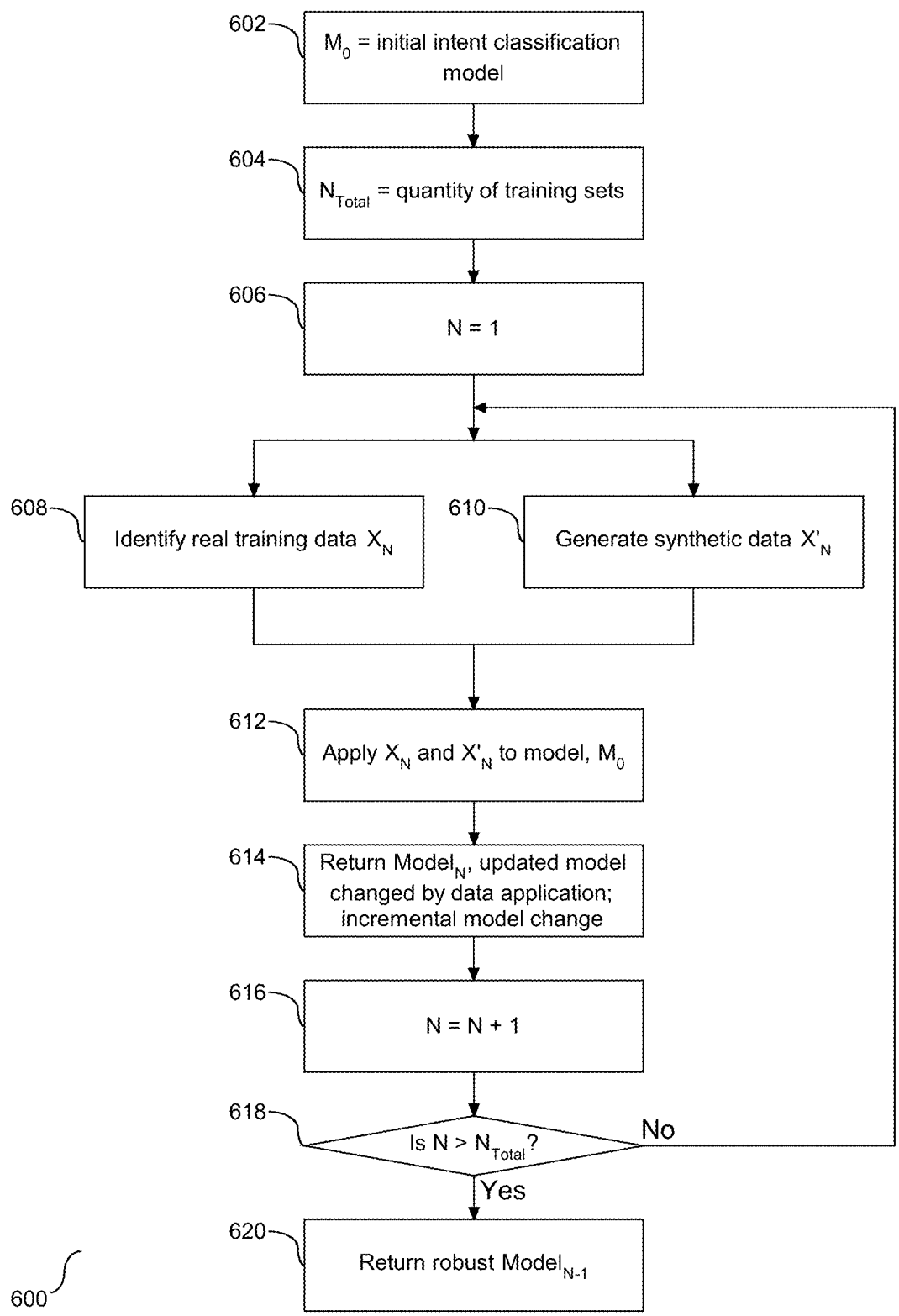
FIG. 6 depicts a flow chart illustrating an exemplary process for managing evolution of the classification model shown and described in FIG. 5.

Referring to FIG. 6, a flow chart (600) is provided to illustrate an exemplary process for managing evolution of the classification model shown and described in FIG. 5. It is understood that the adversarial training of the classification model is dynamic, and subject to change. The variable $M_0$ represents that initial intent classification model (602), and the variable $N_{Total}$ represents the number of training sets (604). A training set counting variable is initialized (606). Real training data, $X_N$, is identified (608), and synthetic data, $X'_N$, is generated (610). The real training data, $X_N$, and the synthetic data, $X'_N$, are applied to the initial intent classification model, $M_0$, (612). In one embodiment the synthetic data with the minimum log likelihood value is merged with the training data, referred to herein as data augmentation. The model, $M_0$, is modified to reflect application of the training data and the selected synthetic data (614). Application of the synthetic data introduces extra information, e.g. noise, to add robustness to the intent classification model. The modified intent classification model, also referred to herein as an updated classification model, reflects an incremental change in the model and is referred to herein as Model$_N$ reflecting the training set with the adversarial data, e.g. the synthetic data with the minimum log likelihood value.

Following the model modification, the training set variable is incremented (616), and it is determined if each of the training sets and corresponding synthetic utterance data have been applied to the classification model (618). A negative response to the determination at step (618) is followed by a return to steps (608) and (610) for further evaluation and application of data to the current version of the intent classification model, and a positive response concludes adversarial training of the intent classification model. The most recent version of the intent classification model, Model$_{N-1}$ is returned (620), or in one embodiment identified. Accordingly, as shown herein, the intent classification model is subject to an incremental adversarial training process by incorporating adversarial synthetic data into the model training data.

Figure 7:
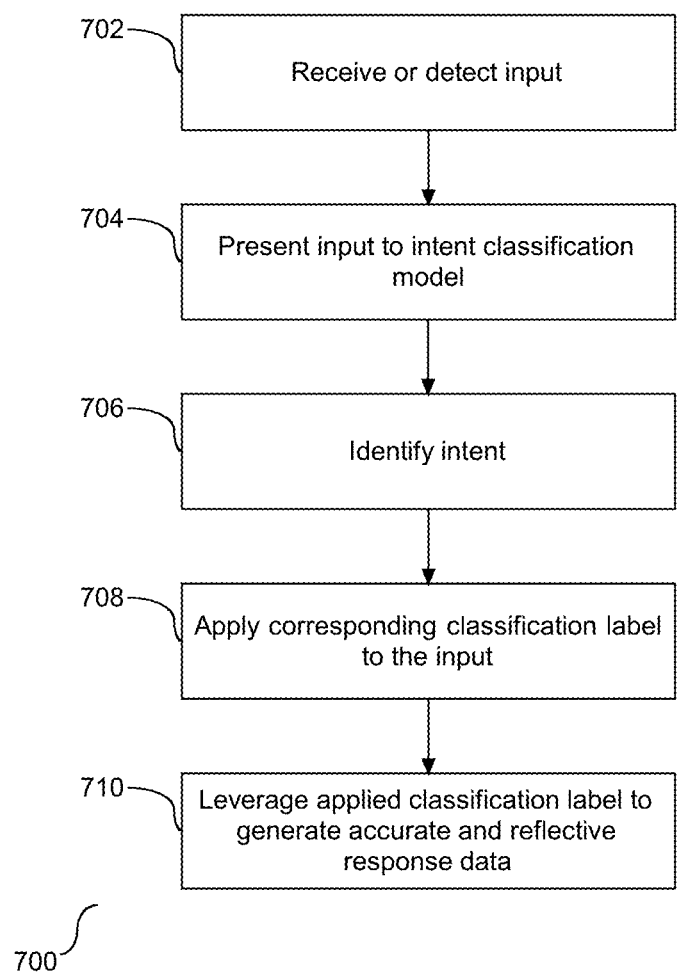
FIG. 7 depicts a flow chart illustrating application of the intent classification model.

The purpose and goal of the intent classification model is to use an intent classification that has been subject to adversarial training to label intent from utterances. Application of synthetic data to the model enables the model to become more robust. Referring to FIG. 7, a flow chart (700) is provided to illustrate application of the intent classification model. As shown, input is received or detected (702). In one embodiment, the input is a text or image. Similarly, in one embodiment, the input is natural language (NL) that is subject to processing, e.g. natural language processing (NLP). The received text input or the input converted to text is presented or otherwise received by the intent classification model (704), and a corresponding intent of the received input is identified (706). In one embodiment, the identified intent corresponds to the topic of the received input. Using the intent, a classification label is applied to the received input (708), and a library or corpus corresponding to the classification label is leveraged to return accurate response data with respect to the received input (710). Accordingly, trained intent classification model is applied to the received input to generate accurate and reflective response data.

As shown and described in FIGS. 1-7, the intent classification model is subject to adversarial training and modification beyond the initial training, with the adversarial training including real training data and select synthetic training data. As input is received, the model is consulted to generate output. At the same time, augmentation of the model may take place dynamically with the received input, and applied to the intent classification model to continue the evolution and adversarial training of the model. For example, the received input may be used to generate new synthetic data from which a new subset of the synthetic data may be added to the training set for the adversarial training. Accordingly, the intent classification model is subject to dynamic modification with respect to model training, and in one embodiment with respect to received input.

The block diagrams and flow charts shown herein may also be in the form of a computer program device for use with an intelligent computer platform in order to facilitate NLU and NL processing. The device has program code embodied therewith. The program code is executable by a processing unit to support the described functionality.

As shown and described herein, the supported embodiments may be in the form of a system with an intelligent computer platform for dynamically integrated content processing with classification modeling. Embodiments may also be in the form of a computer program device for use with an intelligent computer platform in order to assist the intelligent computer platform to dynamically integrated content processing and classification modeling. The device has program code embodied therewith. The program code is executable by a processing unit to support the tools of the AI platform (150). Content processing supported by the trainer (152) and classifier (154) may be performed in accordance to slot grammar logic (SGL) or any other form of natural language processing.

With references to FIG. 8, a block diagram (800) is provided illustrating an example of a computer system/server (802), hereinafter referred to as a host (802) in communication with a cloud based support system, to implement the system and processes described above with respect to FIGS. 1-7. Host (802) is operational with numerous other general purpose or special purpose computing system environments or configurations. Examples of well-known computing systems, environments, and/or configurations that may be suitable for use with host (802) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (802) may be described in the general context of computer system-executable instructions, such as program modules, being executed by a computer system. Generally, program modules may include routines, programs, objects, components, logic, data structures, and so on that perform particular tasks or implement particular abstract data types. Host (802) may be practiced in distributed cloud computing environments (810) where tasks are performed by remote processing devices that are linked through a communications network. In a distributed cloud computing environment, program modules may be located in both local and remote computer system storage media including memory storage devices.

Figure 8:
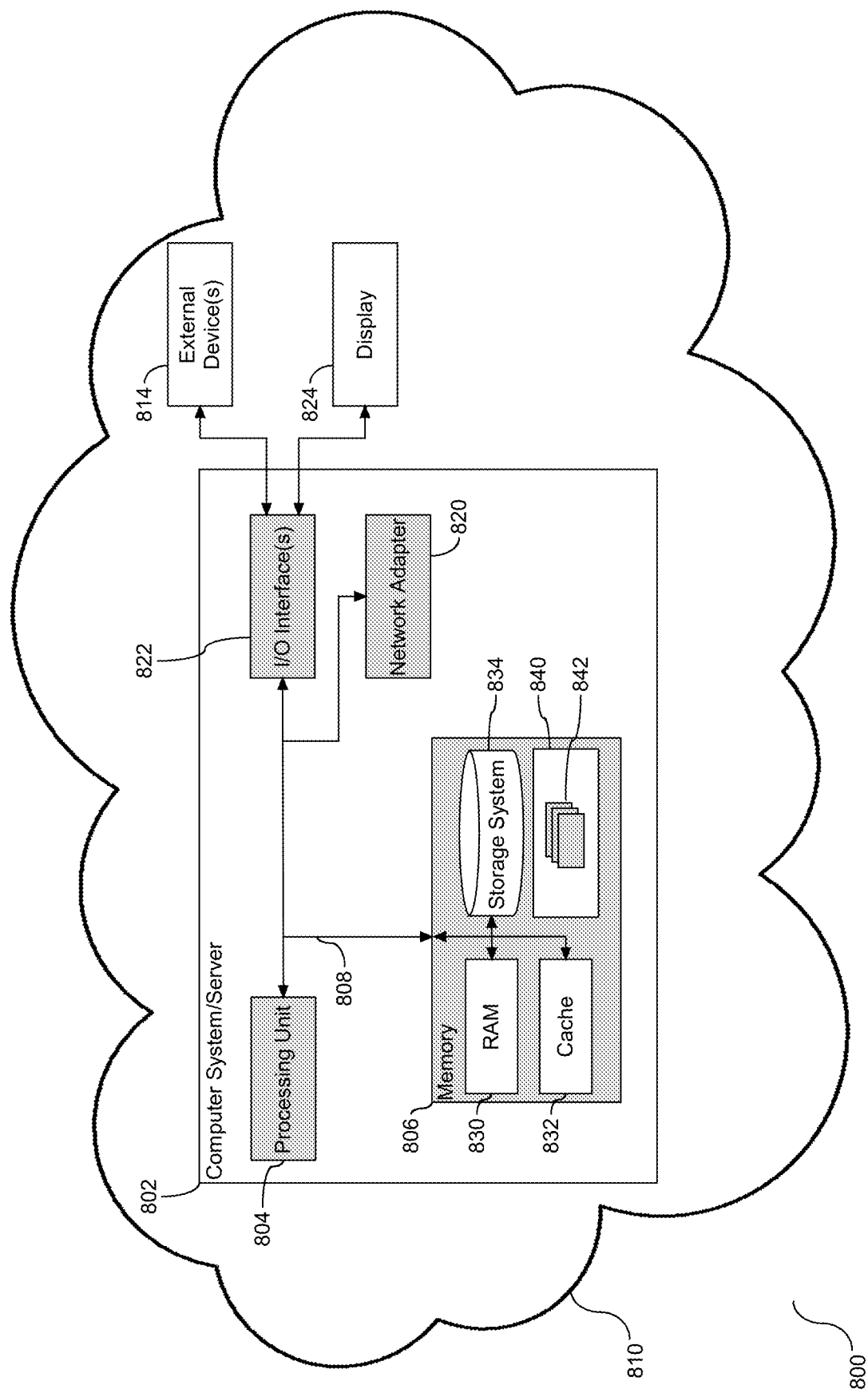
FIG. 8 is a block diagram illustrating an example of a computer system/server of a cloud based support system, to implement the system and processes described above with respect to FIGS. 1-7.

As shown in FIG. 8, host (802) is shown in the form of a general-purpose computing device. The components of host (802) may include, but are not limited to, one or more processors or processing units (804), a system memory (806), and a bus (808) that couples various system components including system memory (806) to processor (804). Bus (808) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (802) typically includes a variety of computer system readable media. Such media may be any available media that is accessible by host (802) and it includes both volatile and non-volatile media, removable and non-removable media.

Memory (806) can include computer system readable media in the form of volatile memory, such as random access memory (RAM) (830) and/or cache memory (832). By way of example only, storage system (834) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (808) by one or more data media interfaces.

Program/utility (840), having a set (at least one) of program modules (842), may be stored in memory (806) by way of example, and not limitation, as well as an operating system, one or more application programs, other program modules, and program data. Each of the operating systems, one or more application programs, other program modules, and program data or some combination thereof, may include an implementation of a networking environment. Program modules (842) generally carry out the functions and/or methodologies of embodiments of the adversarial training and dynamic classification model evolution. For example, the set of program modules (842) may include the modules configured as the AI platform, the trainer, and the classifier, as described in FIG. 1.

Host (802) may also communicate with one or more external devices (814), such as a keyboard, a pointing device, a sensory input device, a sensory output device, etc.; a display (824); one or more devices that enable a user to interact with host (802); and/or any devices (e.g., network card, modem, etc.) that enable host (802) to communicate with one or more other computing devices. Such communication can occur via Input/Output (I/O) interface(s) (822). Still yet, host (802) can communicate with one or more networks such as a local area network (LAN), a general wide area network (WAN), and/or a public network (e.g., the Internet) via network adapter (820). As depicted, network adapter (820) communicates with the other components of host (802) via bus (808). In one embodiment, a plurality of nodes of a distributed file system (not shown) is in communication with the host (802) via the I/O interface (822) or via the network adapter (820). It should be understood that although not shown, other hardware and/or software components could be used in conjunction with host (802). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (806), including RAM (830), cache (832), and storage system (834), such as a removable storage drive and a hard disk installed in a hard disk drive.

Computer programs (also called computer control logic) are stored in memory (806). Computer programs may also be received via a communication interface, such as network adapter (820). Such computer programs, when run, enable the computer system to perform the features of the present embodiments as discussed herein. In particular, the computer programs, when run, enable the processing unit (804) to perform the features of the computer system. Accordingly, such computer programs represent controllers of the computer system.

In one embodiment, host (802) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 9:
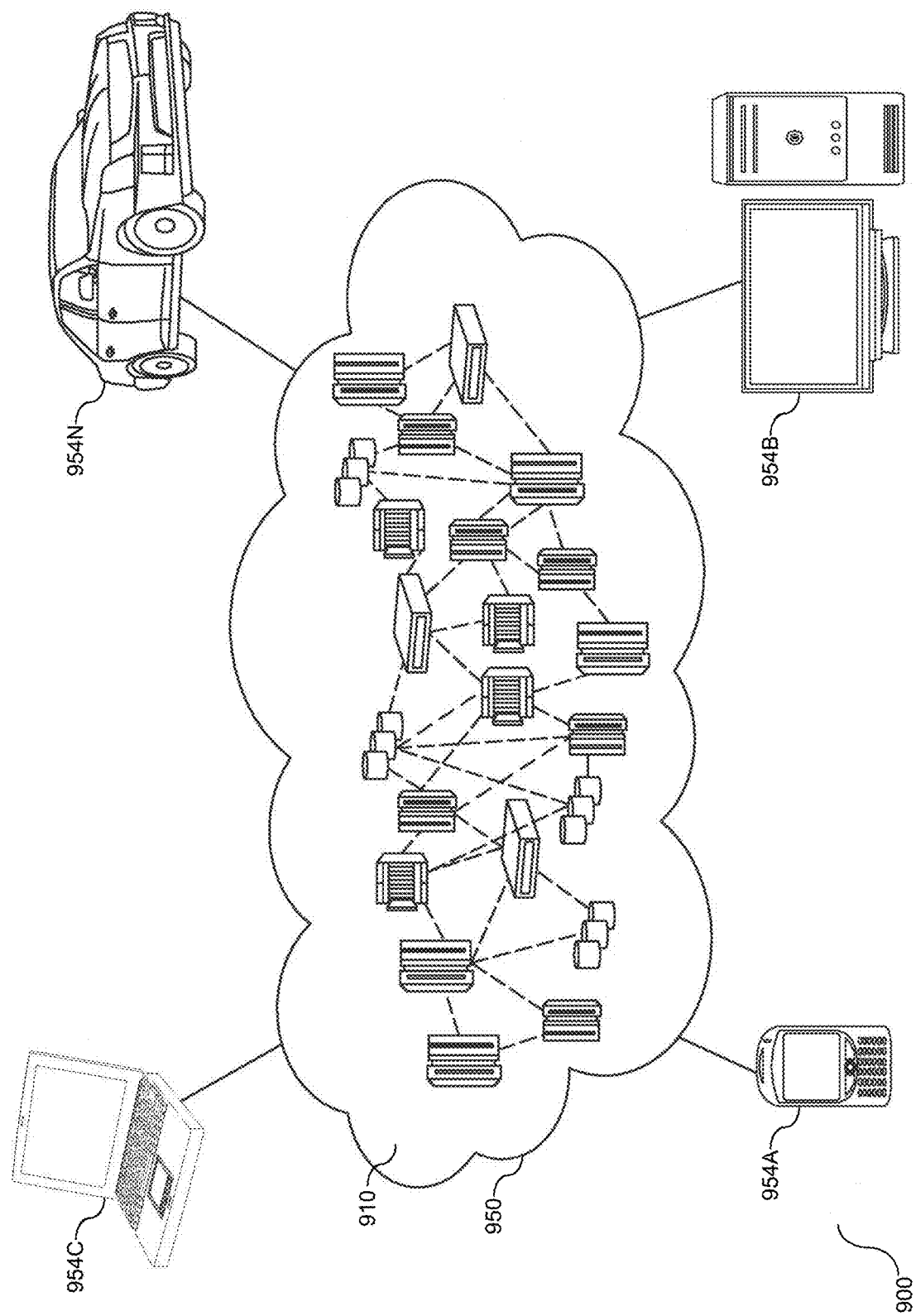
FIG. 9 depicts a block diagram illustrating a cloud computer environment.

Referring now to FIG. 9, an illustrative cloud computing network (900). As shown, cloud computing network (900) includes a cloud computing environment (950) having one or more cloud computing nodes (910) with which local computing devices used by cloud consumers may communicate. Examples of these local computing devices include, but are not limited to, personal digital assistant (PDA) or cellular telephone (954A), desktop computer (954B), laptop computer (954C), and/or automobile computer system (954N). Individual nodes within nodes (910) may further communicate with one another. They may be grouped (not shown) physically or virtually, in one or more networks, such as Private, Community, Public, or Hybrid clouds as described hereinabove, or a combination thereof. This allows cloud computing environment (900) to offer infrastructure, platforms and/or software as services for which a cloud consumer does not need to maintain resources on a local computing device. It is understood that the types of computing devices (954A-N) shown in FIG. 9 are intended to be illustrative only and that the cloud computing environment (950) can communicate with any type of computerized device over any type of network and/or network addressable connection (e.g., using a web browser).

Figure 10:
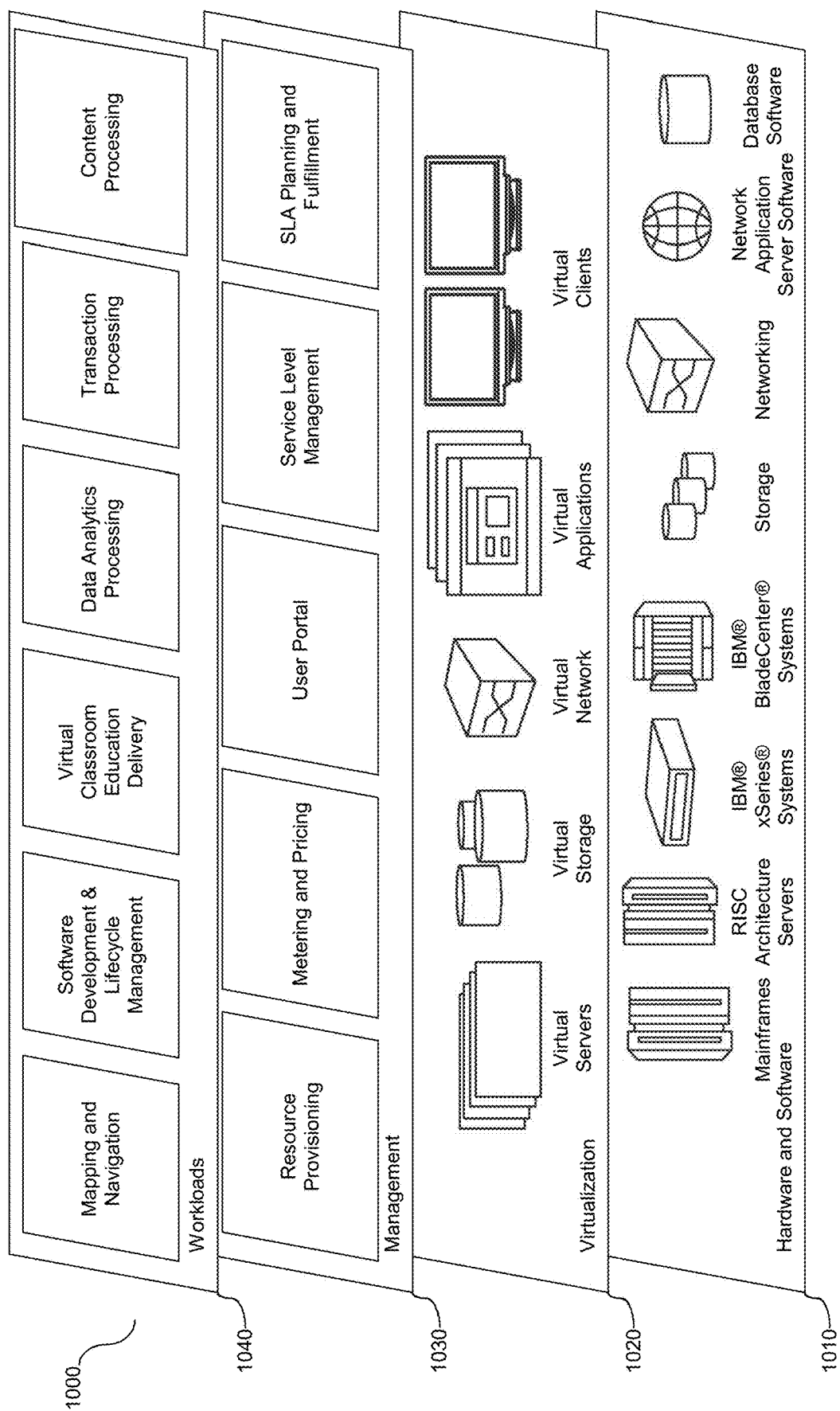
FIG. 10 depicts a block diagram illustrating a set of functional abstraction model layers provided by the cloud computing environment.

Referring now to FIG. 10, a set of functional abstraction layers (1000) provided by the cloud computing network of FIG. 9 is shown. It should be understood in advance that the components, layers, and functions shown in FIG. 10 are intended to be illustrative only, and the embodiments are not limited thereto. As depicted, the following layers and corresponding functions are provided: hardware and software layer (1010), virtualization layer (1020), management layer (1030), and workload layer (1040). The hardware and software layer (1010) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1020) provides an abstraction layer from which the following examples of virtual entities may be provided: virtual servers; virtual storage; virtual networks, including virtual private networks; virtual applications and operating systems; and virtual clients.

In one example, management layer (1030) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (1040) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and content processing.

While particular embodiments have been shown and described, it will be obvious to those skilled in the art that, based upon the teachings herein, changes and modifications may be made without departing from the embodiments and their broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to the embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of a machine learning model based on pattern dissection of content and associated classification modeling and processing.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to the disclosed embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the natural language processing may be carried out by different computing platforms or across multiple devices. Furthermore, the data storage and/or corpus may be localized, remote, or spread across multiple systems. Accordingly, the scope of protection of the embodiments are is limited only by the following claims and their equivalents.

What is claimed is:

1. A computer system comprising:
   a processing unit in communication with memory; and
   an artificial intelligence (AI) platform in communication with the processing unit, the AI platform configured to support natural language processing, including:
      a classifier, using natural language understanding (NLU), configured to evaluate received input, including:
         process the received input against an adversarial training set;
         leverage the adversarial training set, and predict a classification label of the received input;
         use the predicted classification label to identify a corresponding classification model of the received input;
         identify, by the classification model, an intent corresponding to the received input;
         execute the identified classification model, including using the received input as characteristic data to the classification model; and
         produce response data generated from the classification model execution, wherein the response data reflects the received input; and
      a trainer operatively coupled to the classifier and configured to:
         generate new synthetic training data using the received input;
         narrow the new synthetic training data to a narrowed set, including to apply a log likelihood value to mathematically assess a proximity of the new synthetic training data to the intent corresponding to the received input; and
         leverage the narrowed set of the new synthetic training data to dynamically augment training of the identified classification model.

2. The system of claim 1, further comprising the classifier configured to assign the predicted classification label to the input and classify a semantic meaning of the received input.

3. The system of claim 1, wherein the trainer is configured to modify the identified classification model with the received input and the generated response data.

4. The system of claim 3, wherein the dynamically augmented classification model functions as a NLU domain classification index.

5. A computer program product comprising:
   a computer readable storage medium having computer readable program code embodied therewith, the program code being executable by a processor to support natural language processing, including program code to:
      use natural language understating (NLU) to process received input against an adversarial training set;

leverage the adversarial training set, and predict a classification label of the received input;
use the predicted classification label to identify a corresponding classification model of the received input;
identify an intent corresponding to the received to the received input;
execute the identified classification model, including using the received input as characteristic data to the classification model;
produce response data generated from the classification model execution, wherein the response data reflects the received input;
generate new synthetic training data using the received input;
narrow the new synthetic training data to a narrowed set, including to apply a log likelihood value to mathematically assess a proximity of the new synthetic training data to the intent corresponding to the received input; and
leverage the narrowed set of the new synthetic training data to dynamically augment training of the identified classification model.

6. The computer program product of claim 5, further comprising program code executable by the processor to assign the predicted classification label to the input and classify a semantic meaning of the received input.

7. The computer program product of claim 5, further comprising program code executable by the processor to modify the identified classification model with the received input and the generated response data.

8. The method of claim 7, wherein the dynamically augmented classification model includes program code executable by the processor to function as a NLU domain classification index.

9. A method for processing natural language, comprising:
using natural language understanding (NLU), processing received input against an adversarial training set;
leveraging the adversarial training set, and predicting a classification label of the received input;
using the predicted classification label to identify a corresponding classification model of the received input;
identifying, by the classification model, an intent corresponding to the received input;
executing the identified classification model, including using the received input as characteristic data to the classification model;
producing response data generated from the classification model execution, wherein the response data reflects the received input;
generating new synthetic training data using the received input;
narrowing the new synthetic training data to a narrowed set, including applying a log likelihood value to mathematically assess a proximity of the new synthetic training data to the intent corresponding to the received input; and
leveraging the narrowed set of the new synthetic training data to dynamically augment training of the identified classification model.

10. The method of claim 9, further comprising assigning the predicted classification label to the input and classifying a semantic meaning of the received input.

11. The method of claim 9, further comprising modifying the identified classification model with the received input and the generated response data.

12. The method of claim 11, wherein the dynamically augmented classification model functions as a NLU domain classification index.

\* \* \* \* \*